United States Patent [19]
Langerak et al.

[11] Patent Number: 5,227,063
[45] Date of Patent: Jul. 13, 1993

[54] TUBULAR MEMBRANE MODULE

[75] Inventors: Robert W. Langerak; Paul B. Koehler, both of Burlington; Fernando A. Tonelli, Dundas, all of Canada

[73] Assignee: Zenon Environmental Inc., Burlington, Canada

[21] Appl. No.: 501,997

[22] Filed: Mar. 30, 1990

Related U.S. Application Data

[63] Continuation-in-part of Ser. No. 416,574, Oct. 3, 1989, abandoned.

[51] Int. Cl.$^5$ .................. B01D 39/16; B01D 63/06
[52] U.S. Cl. ................... 210/321.78; 210/321.87; 210/500.23; 55/158
[58] Field of Search ............ 210/321.78, 321.87, 210/937, 457, 460, 484, 500.23; 55/158

[56] References Cited

U.S. PATENT DOCUMENTS

| | | | |
|---|---|---|---|
| 3,965,012 | 6/1976 | Eguchi et al. | 210/321.86 |
| 4,309,287 | 1/1982 | Roos et al. | 210/247 |
| 4,339,334 | 7/1982 | Eguchi et al. | 210/433.2 |
| 4,517,720 | 5/1985 | Otstat et al. | 210/232 |
| 4,612,119 | 9/1986 | Eguchi | 210/500.41 |

Primary Examiner—Robert A. Dawson
Assistant Examiner—W. L. Millard
Attorney, Agent, or Firm—Alfred D. Lobo

[57] ABSTRACT

A tubular membrane module for example for use in ultrafiltration has a tubular shell made of standard PVC pipe provided with moulded PVC end fittings that are secured to the pipe by epoxy resin adhesive. A membrane tube within the shell extends between the end fittings and is secured by a similar adhesive in respective sockets within the end fittings. Each socket has a blind end that receives the end portion of the membrane tube so that the tube is protected from shear effects due to fluid entering the tube under pressure in use.

16 Claims, 3 Drawing Sheets

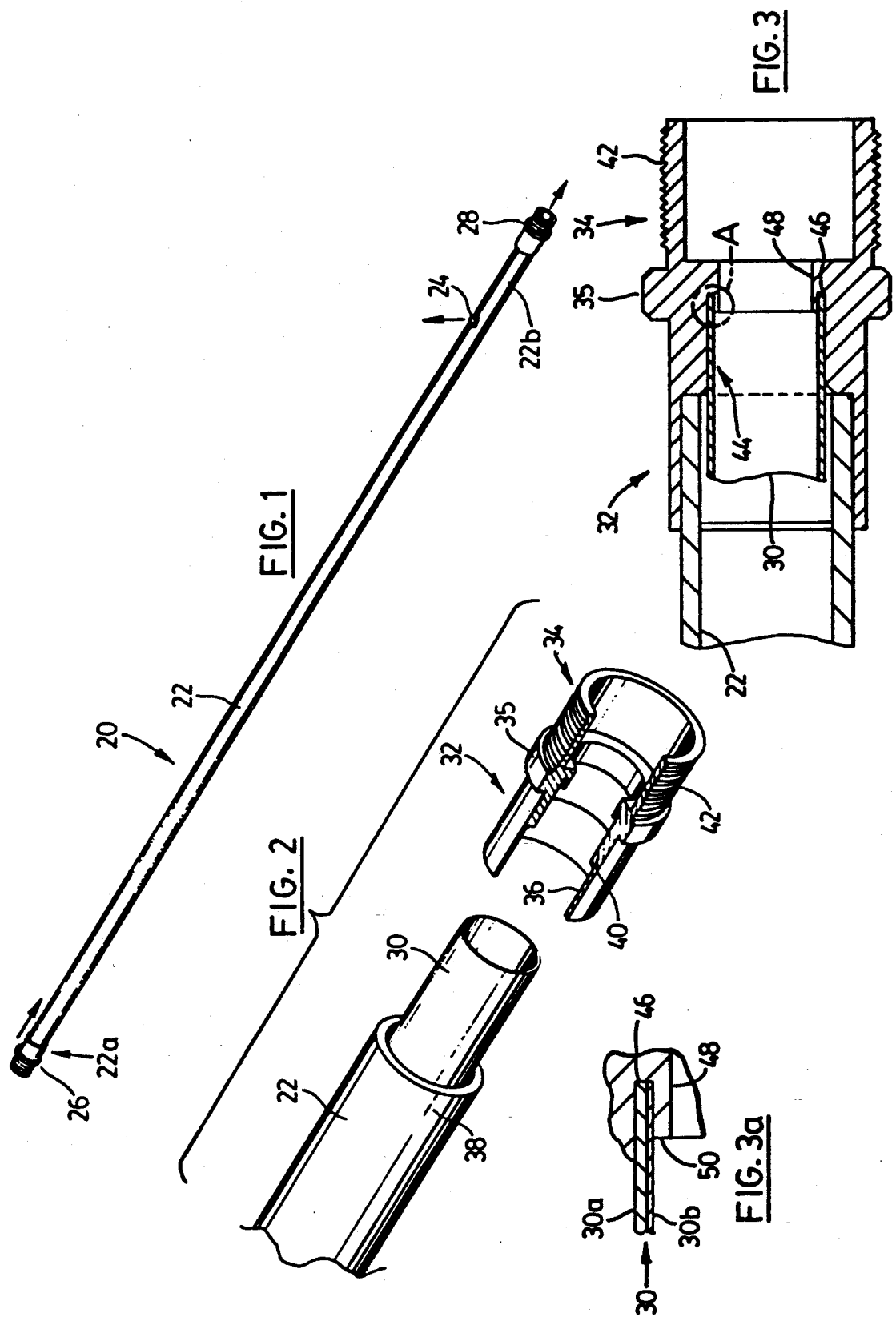

TUBULAR MEMBRANE MODULE

CROSS-REFERENCE TO RELATED APPLICATIONS

This application is a continuation-in-part of application Ser. No. 07/416,574 filed Oct. 3, 1989, now abandoned.

FIELD OF THE INVENTION

This invention relates to tubular membrane modules used in pressure-driven fluid concentration and/or separation processes. Examples of such processes are microfiltration, ultrafiltration and reverse osmosis.

BACKGROUND OF THE INVENTION

The term "tubular membrane module" is used to refer to a component which includes at least one tube comprising a semi-permeable membrane of tubular configuration supported on the inner surface of a porous pipe such as a glass fibre-reinforced fabric pipe. The tube is enclosed within an outer housing or "shell" having a permeate outlet. Fluid to be treated is passed through the tube under pressure. Permeate passes through the membrane and pipe into the interior of the housing and leaves through the permeate outlet. In some cases, a single tube is used, while in others the module may include a series of tubes arranged axially parallel to one another. A complete ultrafiltration apparatus, for example, will typically include at least one array of modules connected together so that fluid to be treated flows successively therethrough. The modules are usually replaceable individually.

DESCRIPTION OF THE PRIOR ART

It will be understood that a module must be designed so that there is a pressure-tight seal between the individual membrane tube or tubes and the interior of the outer housing or shell of the module. One approach is to embed or "pot" end portions of the membrane tube or tubes in a mass of synthetic resin material that in effect plugs the ends of the housing. This approach is exemplified by the teachings of U.S. Pat. Nos. 4,707,261 and 4,747,946 (Ikeyama et al.). These patents both disclose a tubular membrane ultrafiltration module in which a plurality of water permeable non-woven fabric pipes are formed on the inside surface of an outer cylinder. The pipes are inserted into the outer cylinder in a closely bundled state and the spaces between the pipes and the outer cylinder at each end are filled with a synthetic resin material. When the resin cures, the result is a monolithic structure of non-woven fabric pipes set in an outer cylinder by means of the hardened synthetic resin.

A difficulty with this approach is that the synthetic resin material tends to flow under gravity during the curing process. As a result, the respective ends of the module must be "potted" separately and the resin in one end must be allowed to set before the other end of the module is potted. A special jig is usually used to support the module while the resin sets. Another problem is that this method does not protect the membrane face from the effect of fluid "shear" that would otherwise tend to strip the membrane from its supporting pipe.

Other examples of this design concept are shown in U.S. Pat. No. 3,722,694 (Agranat) and in U.S. Pat. No. 4,334,993 (Norton).

Another approach to the problem of sealing the ends of the membrane tube or tubes is to provide each end of each tube with a rubber "boot" type of seal, for example as disclosed in U.S. Pat. No. 3,834,545 (Del Pico et al.). In this design, the end portions of the membrane tubes are each embraced by a rubber boot having an inner wall that extends over the membrane at the interior the tube and an outer wall that lies on the exterior of the tube. The end portion of the tube, covered by the boot, is received in a complimentary opening in a header and the boot has external ridges that seal against the interior surface of the header. A metal clip is usually provided inside the tube to urge the boot against the tube.

Boot seal failures are quite common with this design. The life of the seal is often adversely affected by abrasion due to relative movement between the membrane tube and the housing as a result of temperature changes in service.

The following patents were also considered in the preparation of the above-identified application: U.S. Pat. Nos. 2,353,489 (Newcomb), 4,309,287 (Roos et al.), 4,400,019 (Fruck),

SUMMARY OF THE INVENTION

An object of the present invention is to provide a tubular membrane module which avoids the sealing problems of the prior art.

The module provided by the invention includes a tubular shell having first and second ends and a permeate outlet adjacent one of said ends. First and second end fittings are provided at the respective ends of the shell and are adapted to permit coupling of the module to external fluid inlet and outlet means for flow of the fluid through the module. A membrane tube extends between the fittings within the shell and comprises a porous pipe having a permeable membrane on an inner surface thereof. Each of the end fittings has inner and outer end portions. The inner end portion has a tubular surface dimensioned to make surface-to-surface contact with a corresponding tubular surface portion at an end of the shell and the surfaces are sealed together (for example by adhesive). The outer end portion has means for coupling to the external fluid inlet means or outlet means referred to previously. A socket is provided inwardly of the tubular surface of the inner end portion and has a blind end closely receiving an end portion of the membrane tube and in which the tube end portion is secured by adhesive. A port of smaller diameter than and within the blind end provides communication between the interior of the tube and the exterior of the fitting through the outer end portion thereof.

The adhesive could be an epoxy resin or a polyurethane adhesive and the components of the module made of one or more plastics materials that can be bonded together by this type of adhesive. For example, the tubular shell may be a section of standard PVC (polyvinylchloride) pipe and the end fittings may be moulded in PVC material. In this embodiment, the assembled module is essentially a monolithic structure having a high resistance to fluid leakage. In other words, the module exhibits the advantages of the prior art designs that utilize potting of the membrane tubes in an epoxy resin material, but without the difficulties of manufacture presented by the prior art designs.

BRIEF DESCRIPTION OF THE DRAWINGS

In order that the invention may be more clearly understood, reference will now be made to the accompanying drawings which illustrate a particular preferred embodiment of the invention by way of example, and in which:

FIG. 1 is a perspective view of a tubular membrane module in accordance with a preferred embodiment of the invention;

FIG. 2 is an exploded perspective view of one end portion of the module shown in FIG. 1, the other end portion being identical;

FIG. 3 is a longitudinal sectional view corresponding to FIG. 2 but showing the components of the module assembled;

FIG. 3a is an enlarged detail view of the part of FIG. 3 that is indicated at A; and, FIGS. 4 to 8 are partial perspective views illustrating modifications that may be incorporated in the module for assuring permeate flow to the permeate outlet of the module.

DESCRIPTION OF THE PREFERRED EMBODIMENT

Figure 4:
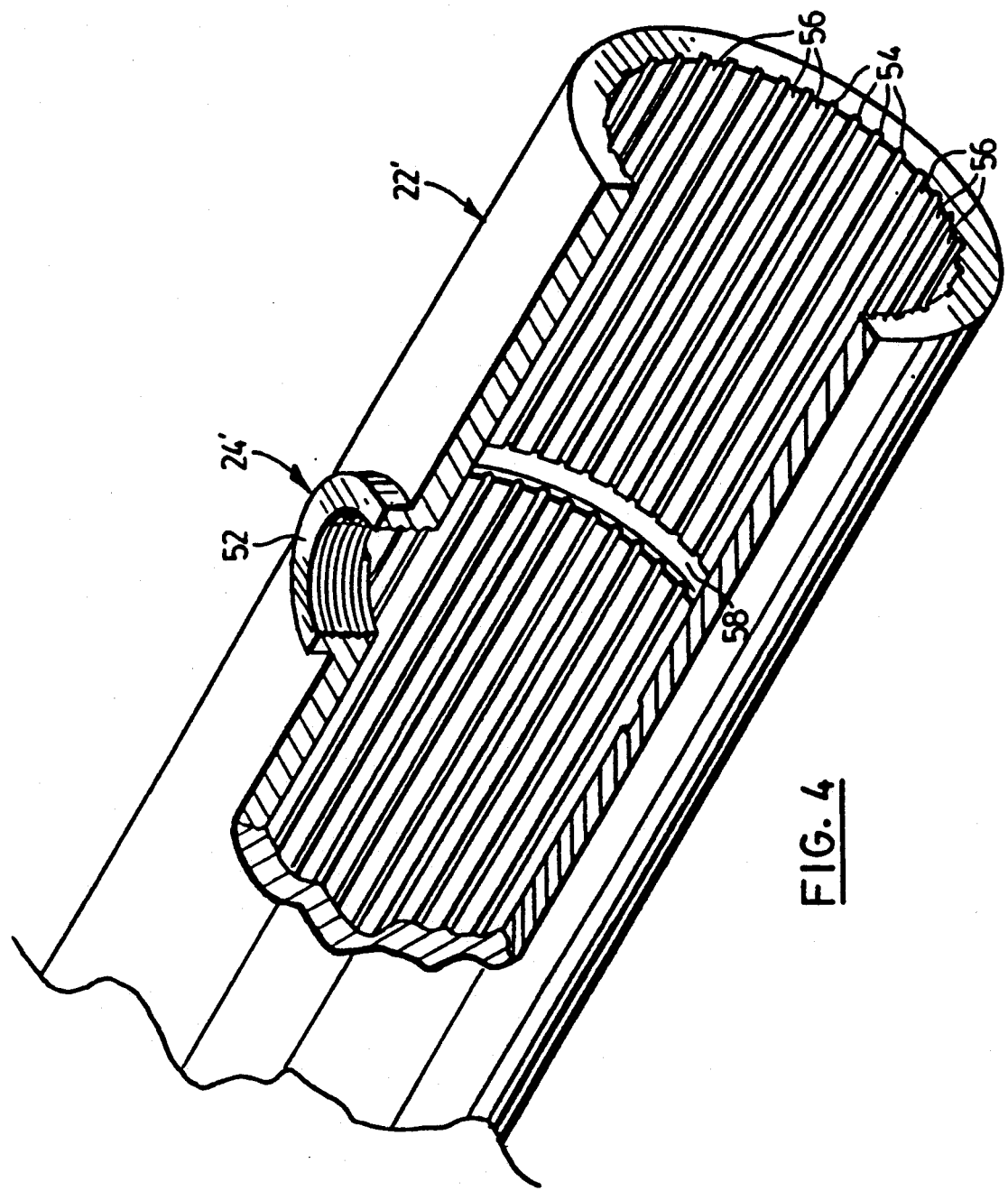

The drawings show a tubular membrane module that was developed primarily for use in an ultrafiltration apparatus, for example for separating oil from water. The apparatus itself has not been shown since it is not part of the present invention, and may be conventional. In FIG. 1, the module is denoted generally by reference numeral 20. By way of illustration, the module may have an overall length of approximately 10 feet and a nominal external diameter corresponding to the diameter of standard PVC pipe of 1 inch internal diameter. An ultrafiltration unit will normally include at least one array or bank of similar modules coupled together for series flow of fluid through at least several of the modules.

Module 20 includes a tubular shell 22 which has first and second end portions 22a and 22b respectively and a permeate outlet 24 adjacent end 22b. The shell is made of a standard length of 1 inch ID PVC pipe as indicated previously. Respective end fittings 26 and 28 are provided at opposite ends of the shell and are designed to permit the module to be coupled to external components for permitting fluid flow through the module. As shown in the drawing, fitting 26 is at the inlet end of the module and fitting 28 at the outlet end. Fluid to be filtered will enter the module under pressure through fitting 26 and the filtered fluid will leave through fitting 28 while permeate will leave through outlet 24. In the illustrated embodiment, outlet 24 is a threaded hole in the wall of shell 22 into which a suitable outlet fitting (not shown) can be secured by adhesive.

Referring now to FIGS. 2 and 3, a membrane tube 30 extends between the end fittings 26 and 28 within shell 22. FIGS. 2 and 3 show end fitting 28 only but may be taken as representative of both ends of the module because the two end fittings are identical.

Membrane tube 30 comprises a porous pipe 30a having a permeable membrane 30b on its inner surface (see FIG. 3a). In this particular embodiment, the pipe is a polyester straw made from spirally wound polyester tape impregnated with "dots" of polyethylene or polypropylene, or other plastic material which are thermally activated to bond together the wound tape and form a rigid pipe. A polypropylene straw may be used as an alternative. The semi-permeable membrane is cast onto the inside surface of the pipe as it is made. The structure of the membrane tube and its method of manufacture have not been specifically illustrated in the drawings since they will be familiar to a person skilled in the art. Also, other types of pipe may be used within the broad scope of the invention, for example a porous FRP (fibre-reinforced plastic) pipe with a suitable liner at the inner surface.

The two end fittings 26 and 28 of the module are injection moulded in PVC. Fitting 28 will now be described as representative of both fittings. The fitting has inner and outer end portions denoted respectively 32 and 34 separated by a collar 35 that provides a flange for mounting the module in the ultrafiltration unit. The inner end portion 32 of the fitting has a tubular internal surface 36 that is dimensioned to make surface-to-surface contact with a corresponding tubular surface portion 38 at the relevant end of shell 22. In other words, the fitting end portion 32 is essentially a cylindrical sleeve dimensioned to closely receive the end portion 38 of end portion 22b. A shoulder 40 within the fitting defines the fully inserted position of the shell. In the assembled module, the mating surfaces 36 and 38 are secured together by an epoxy resin adhesive so that each end fitting 26 and 28 is sealed to each end of the shell. In an embodiment in which additional clearance is required between the membrane tube and the interior of the shell, the shell could be designed to fit over and be secured to the external surface of fitting end portion 32.

The outer end portion 34 of the fitting also has the form of a cylindrical sleeve; in this case, the sleeve is provided with an external screw thread 42 by which the fitting (and hence the module) can be coupled to appropriate components of the filtration unit itself.

Inwardly of tubular surface 36, the fitting is provided with a socket 44 having a blind end 46 dimensioned to closely receive the relevant end portion of the membrane tube 30. The tube end portion is secured by epoxy resin adhesive within socket 44 with its end face fully seated against the blind end 46. A port 48 of smaller diameter than and within the blind end 46 provides communication between the interior of the membrane tube 30 and the exterior of the fitting, through the outer end portion 34 thereof. It will be seen that the blind end 46 of socket 44 in effect forms an undercut with respect to port 48 leaving a shoulder 50 between the port and tube 30. Shoulder 50 protects the tube from the effects of fluid shear caused by fluid entering tube 30 from port 48 under pressure. The fluid shear effect could otherwise cause the membrane to be stripped from the inner surface of the membrane tube.

Assembly of the module will be effected by first cutting shell 22 and membrane tube 30 to length (if necessary) and then assembling one end of the module. This will be done by simply coating corresponding end portions of the shell and tube with adhesive and assembling them to the relevant end fitting 26 or 28. The opposite ends of the tube and shell will then be coated with adhesive and the other end fitting secured in place. There will be no need to take special precautions to support the components during curing or to allow lengthy curing periods as is necessary with the prior art designs. The resulting structure will be monolithic in nature with a high resistance to fluid leakage either around the membrane tube and into the space between the tube and shell or from the shell itself.

In some cases, it may be desirable to incorporate into the module additional features designed to guard against radial expansion of the membrane tube due to high internal pressures within the tube. Such expansion can cause the tube to compress against the internal wall of the shell, restricting flow of permeate to the permeate outlet of the module. Generally, this will not be a problem where the membrane tube is relatively rigid, for example where a porous FRP pipe is used as part of the membrane tube. However, where expansion may be a problem, the module is provided with means to define at least one permeate channel between the membrane tube and the shell, for assuring permeate flow to the permeate outlet when the module is in use. Preferably, this is accomplished by providing relatively incompressible spacer means on the interior of the shell or the exterior of the membrane tube. The spacer means should preferably not significantly inhibit uniform flow of permeate through the tube wall, circumferentially or longitudinally.

Examples of possible spacer means as shown in FIGS. 4 to 8 will now be described. Generally, the examples are alternatives although two or more could conceivably be used together if necessary.

FIG. 4 shows an embodiment in which the internal surface of the shell of the module is grooved to provide channels to the permeate outlet. For clarity, only the shell itself has been shown in FIG. 4. The shell is denoted by reference numeral 22' and the permeate outlet of the shell is denoted 24'. In this embodiment, the outlet is defined by an integrally moulded, internally screw-threaded collar 52.

The internal surface of shell 22' is formed with a series of angularly spaced, longitudinally extending grooves 54, defining intervening lands 56. In the assembled module, the lands 56 mechanically space the exterior of the membrane tube from the interior of the shell so that permeate flowing through the shell can travel along the grooves towards the permeate outlet. A circumferential groove 58 intersects the longitudinal grooves 54 at the position of the permeate outlet to convey permeate from those grooves to the outlet.

FIGS. 5 to 8 illustrate modifications of the membrane tube to provide mechanical spacer means. In those views, the tube itself is the same as the tube shown in the previous views and is denoted by reference numeral 30. Again, the other components of the module have not been shown and may be as described previously; the shell of the module could be modified as shown in FIG. 4 but normally it will not be necessary to use an internally grooved shell.

Figure 5:
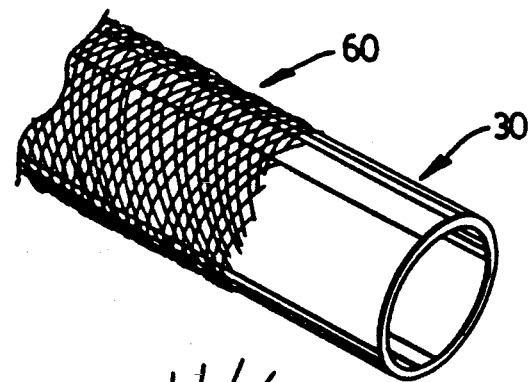

In the embodiment of FIG. 5, the membrane tube is provided with an external sock or sleeve 60 made of an appropriate woven material which provides the required mechanical spacing coupled with permeate flow channels through the material. An example of a suitable material is available under the trade mark VEXAR from Nalle Plastics of Texas. This type of material is characterized as woven packing material and comprises woven filaments formed with external projections or "bumps" to provide mechanical spacing. Sock 60 is a relatively close fit around the membrane tube and, in the assembled module, is held in place as a result of being trapped between the tube and the shell when the tube is under pressure in use. An adhesive may also be used to hold the sock in place. The sock terminates short of the end portions of the tube that are sealed to the end fittings of the module.

Figure 6:
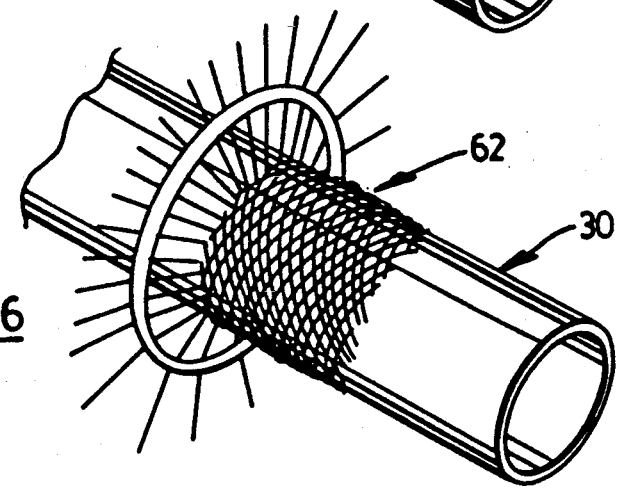

FIG. 6 illustrates a sock 62 that is braided in place on the tube during its manufacture. Braiding may be effected using a conventional braiding machine (not shown) and the braided sock may be formed from filaments of any appropriate type, for example VEXAR filaments. Again, the sock may be trapped and/or secured in place by adhesive.

Figure 7:
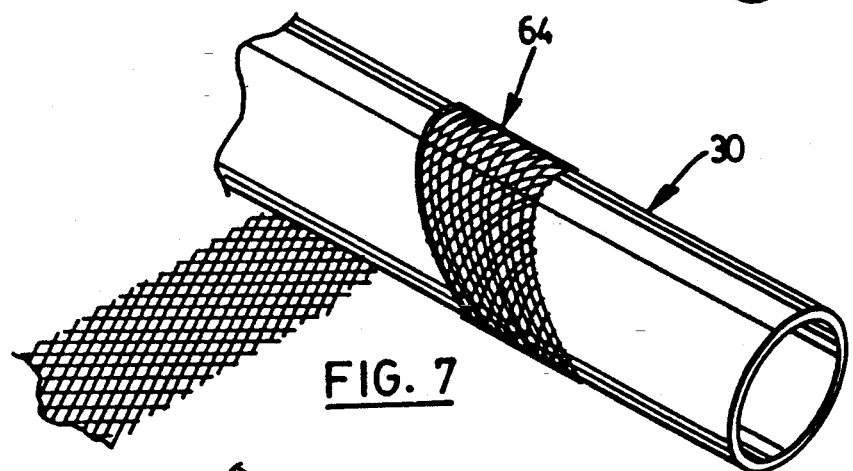
Figure 8:
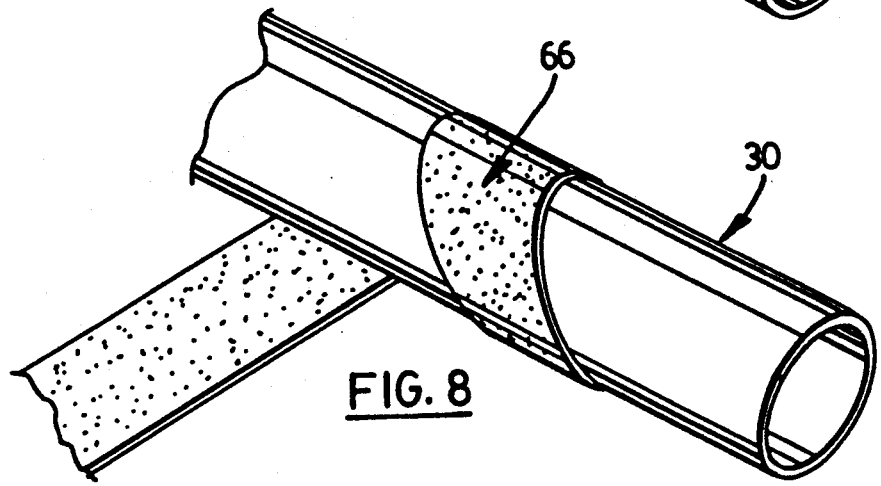

FIGS. 7 and 8 illustrate methods of providing a mechanical spacer by spirally winding a tape of material around a tube. In FIG. 7 the tape is denoted by reference numeral 64 and is a woven material, again possibly made of VEXAR. In FIG. 8, the tape is denoted 66 and is formed of a porous material which is relatively incompressible while at the same time providing permeate flow channels through the material. Examples of suitable material are porous plastic material such as polyethylene, polypropylene and polyester and porous stainless steel, for example in the form of a screen-like mesh.

In the embodiments of FIGS. 7 and 8, the tapes may be wound spirally around the membrane tube with the turns of the spiral abutting one another, or the turns may be spaced; overlapping would be generally undesirable. Preferably, the tape will be secured to the membrane tube, at least at its ends, for example by means of a suitable adhesive.

It should be noted that the preceding description relates to particular preferred embodiments of the invention only and that modifications are possible within the broad scope of the invention.

If necessary, adhesive sealing of the outer shell 22 to the tubular surface of the end fitting at one end of the module could be replaced by an O-ring seal that would allow for relative axial movement between the shell and end fitting to accommodate axial expansion and contraction of the shell with respect to membrane tube 30 due to thermal effects.

For ease of manufacture, the shell will normally be of cylindrical shape and the end fittings will be correspondingly shaped and have cylindrical outer end portions. However, within the broad scope of the invention other tubular shapes could be used.

It should finally be noted that the particular materials and dimensions referred to previously are given by way of example only and are not limitative of the scope of the invention. For example the module shell may be made of plastic materials other than PVC (e.g. CPVC, polyurethane or PVDF) or stainless steel.

We claim:
1. A tubular membrane module comprising:
   a tubular shell having first and second cylindrical end portions and a permeate outlet adjacent one of said ends;
   first and second cylindrical end fittings at the respective ends of the shell adapted to permit coupling of the module to external fluid inlet and outlet means for flow of said fluid through the module; and,
   a cylindrical membrane tube extending between said fittings within said shell and comprising a porous pipe with cylindrical ends having a permeable membrane cast on an inner surface thereof;
   each said end fitting including:
   (i) an inner end portion having a cylindrical tubular surface dimensioned to make surface-to-surface contact with a corresponding tubular surface portion at an end of the shell, said surfaces being adhesively sealed together;
   (ii) an outer end portion having means to couple said module to said external fluid inlet means or outlet means; and,
   (iii) a cylindrical socket inwardly of said tubular surface of the inner end portion, said socket having a blind end closely receiving an end portion of the membrane tube, and in which the tube end portion is secured by adhesive, and a port of smaller diameter than and coaxially within said blind end providing communication between the interior of the tube and the exterior of the fitting through said outer end portion thereof, whereby said module is formed as a monolithic structure.

2. A module as claimed in claim 1, wherein said tubular shell is a standard length of cylindrical plastic pipe.

3. A module as claimed in claim 2, wherein said plastic material is PVC, and which said end fittings are moulded in PVC and the end fittings and shell are secured together by epoxy resin adhesive.

4. A module as claimed in claim 3, wherein said membrane tube comprises a porous polyester pipe having a permeable membrane cast on its inner surface.

5. A module as claimed in claim 1, wherein said tubular shell is cylindrical in shape and wherein said tubular surface of each end fitting is a cylindrical interior surface of the fitting end portion and the corresponding tubular surface portion at the end of the shell is an external surface portion, and wherein the fitting is provided with an internal shoulder for defining a fully inserted position of the shell within the fitting.

6. A module as claimed in claim 1, wherein each said end fitting includes an external collar encircling the fitting between said inner and outer end portions.

7. A module as claimed in claim 1, wherein said outer end portion of each said fitting is of cylindrical shape and is provided with an external screw thread for coupling to said external fluid inlet means or outlet means.

8. A tubular membrane module comprising:

a tubular shell having first and second end portions and a permeate outlet adjacent one of said ends;

first and second end fittings at the respective ends of the shell adapted to permit coupling of the module to external fluid inlet and outlet means for flow of said fluid through the module; and, a cylindrical membrane tube extending between said fittings within said shell and comprising a porous pipe having a permeable membrane on an inner surface thereof;

each said end fitting including:

(i) an inner end portion having a tubular surface dimensioned to make surface-to-surface contact with a corresponding tubular surface portion at an end of the shell, said surfaces being sealed together;

(ii) an outer end portion having means for coupling to said external fluid inlet means or outlet means;

(iii) a socket inwardly of said tubular surface of the inner end portion, said socket having a blind end closely receiving an end portion of the membrane tube, and in which the tube end portion is secured by adhesive, and a port of smaller diameter than and within said blind end providing communication between the interior of the tube and the exterior of the fitting through said outer end portion thereof; and, (iv) means defining at least one permeate channel between the membrane tube and the shell, for assuring permeate flow to said permeate outlet when the module is in use.

9. A module as claimed in claim 8, wherein said means defining at least one permeate channel comprises mechanical spacer means formed on one of the exterior of the membrane tube and interior of the shell, said mechanical spacer means being at least substantially incompressible under internal pressures generated within the membrane tube when the module is in use.

10. A module as claimed in claim 9, wherein said mechanical spacer means is provided by a covering on the external surface of the membrane tube, the covering being formed by a material which provides said mechanical spacing while permitting permeate flow through the material to the permeate outlet.

11. A module as claimed in claim 10, wherein said covering comprises a woven material applied to the exterior of the membrane tube.

12. A module as claimed in claim 11, wherein said covering comprises a sock of said woven material that substantially encloses the membrane tube between said end fittings.

13. A module as claimed in claim 11, wherein said woven material is braided in place on the membrane tube.

14. A module as claimed in claim 11, wherein said woven material takes the form of a tape spirally wound around the membrane tube.

15. A module as claimed in claim 9, wherein the interior surface of the shell is provided with an array of longitudinally extending grooves and intervening lands which are distributed around the circumference of the shell and provide said flow channels and mechanical spacer means respectively, and wherein the shell further includes at least one circumferential flow channel providing communication between said longitudinally extending grooves and said permeate outlet.

16. A module as claimed in claim 10, wherein said covering comprises a porous tape spirally wound around the membrane tube.

* * * * *